United States Patent
Masi et al.

(10) Patent No.: US 9,016,971 B2
(45) Date of Patent: Apr. 28, 2015

(54) MOTOR VEHICLE ELASTIC SUSPENSION JOINT AND MOTOR VEHICLE STRUCTURE COMPRISING SUCH A JOINT

(75) Inventors: Vincent Masi, Paris (FR); Frederic Thomas, Nogent le roi (FR); Yann Verdier, Mantes-la-Jolie (FR)

(73) Assignee: Renault S.A.S., Boulogne-Billancourt (FR)

( * ) Notice: Subject to any disclaimer, the term of this patent is extended or adjusted under 35 U.S.C. 154(b) by 152 days.

(21) Appl. No.: 13/063,364

(22) PCT Filed: Jun. 30, 2009

(86) PCT No.: PCT/FR2009/051270
§ 371 (c)(1),
(2), (4) Date: Sep. 13, 2011

(87) PCT Pub. No.: WO2010/029236
PCT Pub. Date: Mar. 18, 2010

(65) Prior Publication Data
US 2012/0025484 A1    Feb. 2, 2012

(30) Foreign Application Priority Data

Sep. 10, 2008 (FR) .................................. 08 04974

(51) Int. Cl.
*F16F 1/393* (2006.01)
*F16F 1/38* (2006.01)

(52) U.S. Cl.
CPC ........... *F16F 1/3842* (2013.01); *B60G 2204/41* (2013.01); *F16F 1/3935* (2013.01); *F16F 1/3863* (2013.01)

(58) Field of Classification Search
CPC ...... B60G 2204/41; F16F 1/38; F16F 1/3935; F16F 1/3835; F16F 1/393; F16F 1/3863; F16F 1/30; Y10S 16/33
USPC ........... 280/124.13; 267/141.3, 141.4, 141.5, 267/141.7, 270, 140.12, 141.2, 269, 140.13, 267/293; 403/225, 226, 227, 228, 223, 224
See application file for complete search history.

(56) References Cited

U.S. PATENT DOCUMENTS

| | | | | |
|---|---|---|---|---|
| 1,692,837 A * | 11/1928 | Henry | ........................... | 267/270 |
| 1,750,607 A * | 3/1930 | Short | ........................... | 267/270 |
| 1,808,358 A * | 6/1931 | Leipert | ........................ | 267/270 |
| 1,911,866 A * | 5/1933 | Wylie | ........................... | 267/269 |
| 1,955,841 A * | 4/1934 | Tryon | ........................... | 267/270 |
| 1,992,631 A | 2/1935 | Piquerez | | |
| 2,048,256 A * | 7/1936 | Geyer | ........................... | 403/228 |
| 2,324,997 A * | 7/1943 | Brown | ......................... | 267/269 |
| 2,749,160 A | 6/1956 | Cowles | | |
| 2,852,287 A | 7/1958 | Baker | | |
| 3,856,325 A * | 12/1974 | Willetts | ........................ | 280/687 |
| 5,118,087 A * | 6/1992 | Jordens et al. | ........... | 267/140.12 |
| 5,301,414 A * | 4/1994 | Gautheron | ...................... | 29/451 |
| 2002/0079614 A1 | 6/2002 | Kawada et al. | | |

FOREIGN PATENT DOCUMENTS

EP    1 219 853    7/2002

* cited by examiner

*Primary Examiner* — Keith Frisby
(74) *Attorney, Agent, or Firm* — Oblon, McClelland, Maier & Neustadt, L.L.P.

(57) ABSTRACT

An elastic suspension hinge for an automobile, to be fastened to a fastening portion of a structure of the automobile via a clamping mechanism including a fastening element, the hinge being of type that includes an inner sleeve. At least one of the ends of the inner sleeve is configured to engage by conical fitting with the free end of a bushing rigidly connected to the fastening portion of the structure and having a longitudinal passage.

9 Claims, 1 Drawing Sheet

US 9,016,971 B2

MOTOR VEHICLE ELASTIC SUSPENSION JOINT AND MOTOR VEHICLE STRUCTURE COMPRISING SUCH A JOINT

BACKGROUND

The present invention relates to an elastic joint for a motor vehicle suspension component, such as a shock absorber for example, and to a motor vehicle structure on which such a joint is fitted.

Conventionally, the joints of shock absorbers comprise an inner sleeve and an outer sleeve which are cylindrical, have the same axis and between which a sleeve made of elastic material and having the same axis as the other two sleeves is interposed and fixed. The joint serves to connect the shock absorber to the structure of the vehicle. In general, the outer sleeve is shorter than the inner sleeve. The inner sleeve is mounted on a portion of the structure of a motor vehicle by means of a screw and a nut. For this purpose, the structure has a mounting portion, in which there is formed a hole. A screw is inserted into this hole and into the passage in the inner sleeve. A nut, which is screwed onto the free end of the screw, holds, by clamping, the joint on the mounting portion of the structure.

Fitting the joint is a lengthy and tedious process because the maneuver of screwing the nut is, in particular, carried out blind.

Furthermore, in this type of fitting, known as a "cantilevered" fitting, there is a risk of the sleeve sliding along the screw or moving in directions perpendicular to the latter (shear).

Document EP 1 188 948 describes a motor vehicle shock absorber joint as mentioned above, wherein the inner sleeve is extended by a threaded mounting rod which extends axially beyond the outer sleeve and the sleeve made of elastic material. This mounting projection is inserted into the hole made in the mounting portion. A nut screwed onto the free end of this projection holds the joint on the structure by clamping. The mounting projection replaces the screw, thereby making fitting easier, if only by reducing the number of attached clamping elements. In addition, the projection also makes fitting easier by indicating the fitting direction of the joint to the operator.

Shock absorber joints can also be fitted in a yoked manner, that is to say that the inner sleeve is compressed along its length between the two arms of a fitting yoke.

BREIF SUMMARY

One aim of the present invention is to provide a motor vehicle shock absorber joint which enables simple and secure fitting.

This aim is achieved by means of a motor vehicle elastic suspension joint intended to be mounted on a mounting portion of the structure of a motor vehicle by way of clamping means which comprise a mounting element, said joint being of the type that comprises an inner sleeve covered with a sleeve made of elastic material, said inner sleeve having two ends protruding beyond said sleeve made of elastic material and being able to be passed through by said mounting element.

According to the invention, at least one of said ends of said inner sleeve is able to engage by conical interlocking with the free end of a bushing which is integral with said mounting portion of said structure and has a longitudinal passage, such that said mounting element passing through said longitudinal passage and said inner sleeve mounts said joint by clamping on said mounting area of said structure.

Conical interlocking is simple to produce, since it is easy to obtain interlocking without play. The clamping means eliminate any degree of freedom between the bushing and the joint, in particular in directions perpendicular to the longitudinal axis of the bushing and of the inner sleeve.

According to a first embodiment, at least one of said ends of said inner sleeve forms a protruding conical frustum which longitudinally extends said inner sleeve. The presence of the protruding conical frustum indicates the fitting direction of the joint to the operator.

According to a second embodiment, with said inner sleeve having a cylindrical wall, a reentrant conical frustum is formed in the thickness of said wall at least one of said ends of said inner sleeve.

Advantageously, with the inner sleeve having a longitudinal axis, said conical frustum has a top located on said longitudinal axis. An axisymmetrical conical frustum on the same axis as the inner sleeve is thus obtained.

In the second embodiment, said inner sleeve advantageously has, at least at said end which is able to engage by conical interlocking with said bushing, a planar surface which extends radially around said end, such that said joint can be fitted between the arms of a fitting yoke or in abutment against a washer. The advantages that this flange provides will be described hereinbelow.

The present invention also relates to a motor vehicle structure comprising a mounting portion on which is fitted an elastic shock absorber joint comprising an inner sleeve covered with a sleeve made of elastic material, said inner sleeve being mounted on said mounting portion by way of clamping means which comprise a mounting element which passes through said inner sleeve.

According to the invention, firstly, said mounting portion comprises a bushing which has one end secured to said mounting portion and a free end where a longitudinal passage opens out, said mounting element passing thorough said longitudinal passage, and secondly, one of said ends of said inner sleeve engages by conical interlocking with said free end of said bushing.

According to a first embodiment, at least one of said ends of said inner sleeve forms a protruding conical frustum which longitudinally extends said inner sleeve.

According to a second embodiment, with said inner sleeve having a cylindrical wall, a reentrant conical frustum is formed in the thickness of said wall at least one of said ends of said inner sleeve.

Advantageously, with said inner sleeve having a longitudinal axis, said conical frustum has a top located on said longitudinal axis.

Advantageously, in particular in the case of the second embodiment, said inner sleeve has, at least at said end which engages by conical interlocking with said bushing, a planar surface which extends radially around said end, such that said joint can be fitted between the arms of a fitting yoke or in abutment against a washer.

BRIEF DESCRIPTION OF THE DRAWINGS

Further features and advantages of the invention will become apparent from reading the following description of two particular embodiments of the invention, which are given by way of indication but in a nonlimiting manner, with reference to the appended drawings, in which.

DETAILED DESCRIPTION

Figure 1:
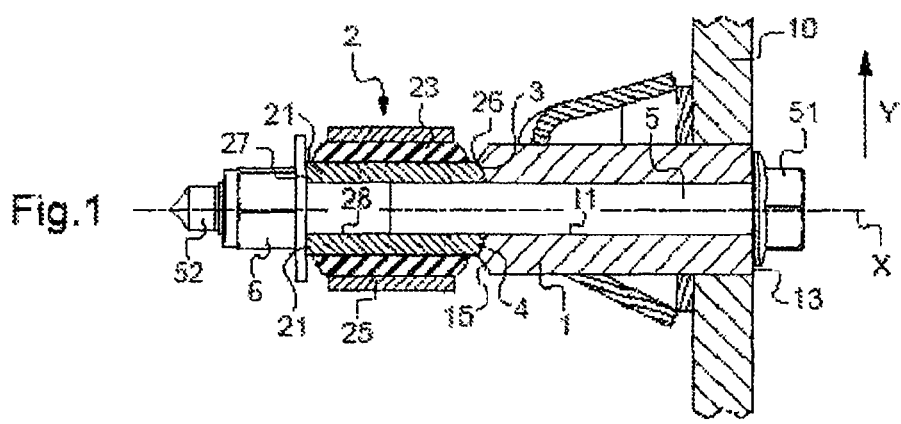
FIG. 1 shows a view in longitudinal section, along the axis of the inner sleeve, of a first embodiment of the invention.

FIG. 1 illustrates a joint fitted in a cantilevered manner according to the invention. A fitting bushing 1 is mounted (welded or otherwise) on a mounting portion of the structure of a motor vehicle. In the present case, the bushing 1 is secured to the inner longitudinal face of a side member 10. The fitting bushing 1 has a longitudinal passage 11 which extends between a first end 13, which is secured to the structure, and a second end 15, which is free. The longitudinal passage 11 opens out at the two ends 13 and 15. The passage 11 can thus be accessed from the rear face of the mounting portion, i.e. that face of the mounting portion which is not located on the same side as the free end 15 of the bushing 1.

As shown in FIG. 1, the joint 2 comprises an inner sleeve 21 covered with a sleeve made of elastic material 23, which is itself covered with an outer sleeve 25. The three sleeves 21, 23 and 25 have the same longitudinal axis X. The inner sleeve 21 has two ends 26 and 27 which protrude beyond the sleeve made of elastic material 23 and beyond the outer sleeve 25, along the longitudinal axis X. The outer sleeve 25 is the shortest of the three sleeves. The inner sleeve 21 defines a longitudinal passage 28 which extends along the axis X between the two ends 26 and 27 and opens out at said ends 26 and 27. This passage 28 has the same longitudinal axis X as the inner sleeve 21. The end 26 forms a conical frustum 3. This conical frustum 3 is an axisymmetrical conical frustum which extends along the axis X and has a top (not shown) located on the axis X. The conical frustum 3 protrudes and thus extends the inner sleeve 21 along the axis X. This conical frustum 3 is interlocked with a reentrant conical frustum 4 formed at the free end 15 of the bushing 1. The respective lengths of the conical frustum 3 and of the conical frustum 4 are such that the two conical frustums 3 and 4 can be interlocked with one another without play, by displacing the joint toward the bushing 1 in the direction of the axis X.

A mounting element 5 of the bolt type is inserted into the longitudinal passage 11 in the bushing 1 and into the passage 28 in the inner sleeve 21 which extends the longitudinal passage 11 of the bushing 1. This mounting element 5, of the screw type, for example, has a head 51 which presses against the rear face of the mounting portion of the motor vehicle structure, at the section of the first end 13 of the bushing 1. This mounting element 5 also has a threaded free end 52 which protrudes out of the inner sleeve 21 and onto which a washer is fitted and a nut 6 is screwed.

The fitting of this first embodiment will now be described with reference to FIG. 1. The operator takes hold of the joint 2. The presence of an end in the form of a conical frustum indicates to him the fitting direction of the joint. He interlocks the conical frustum 3 of the inner sleeve 21 with the reentrant conical frustum 4 of the bushing 1. By rotating the conical frustum 3 in the conical frustum 4 and driving the conical frustum 3 into the conical frustum 4, the operator succeeds in interlocking the two conical frustums 3 and 4 with one another without play. He then inserts the mounting element 5 into the single passage formed by the passage 28 in the inner sleeve 21, which is extended by the passage 11 in the bushing 1. The head 51 is pressed against the rear face of the mounting portion of the structure, at the first end 13 of the bushing 1. A washer is arranged against the free end of the inner sleeve 21 and a nut 6 is screwed against the washer, at the free end 52 of the mounting element 5. The screwing of the nut 6 makes it possible to hold the joint 2, by clamping, on the bushing 1 and to prevent any relative translation of the inner sleeve 21 and of the bushing 1 along the axis X. Conical interlocking prevents translation in the directions perpendicular to X. Rotation of the conical frustum 3 in the conical frustum 4 is prevented by the adhesion of the two interlocked surfaces, this adhesion being reinforced by the clamping of the nut 6 and the bolt 5.

Easy and particularly secure fitting of the joint on the bushing is thus obtained. The protruding cone indicates the fitting direction to the user.

When the two ends of the inner sleeve 21 comprise protruding conical frustums, fitting is easy because the sleeve is perfectly symmetrical and can thus be fitted in either of the two directions on the bushing 1.

Figure 2:
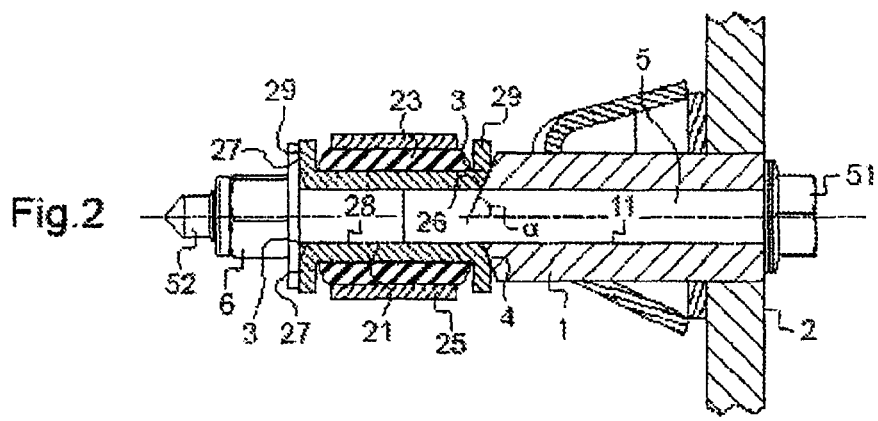
FIG. 2 shows a view in longitudinal section, along the axis of the inner sleeve, of a second embodiment of the invention.

As shown in FIG. 2, in a second embodiment, in which elements in common with the first embodiment described above have identical references, the conical frustum 3 is reentrant. The two ends 26 and 27 of the inner sleeve 21 each have a reentrant axisymmetrical conical frustum 3. The conical frustum 3 is formed in the thickness of the cylindrical wall which forms the inner sleeve 21. The length of the conical frustum 3 is appropriate for obtaining, as in the case of the first embodiment, tight interlocking, without play, of the two conical frustums 3 and 4 so as to prevent any translation of the inner sleeve 21 in a direction perpendicular to the axis X. The conical frustum 3 has a maximum section at the ends 26 and 27 of the inner sleeve 21. The section of the conical frustum 3 decreases in size toward the inside of the inner sleeve 21. The conical frustum 3 has a top located on the axis X. A planar surface, carried by a circular and radial flange 29, equips the circular outer edge of each of the ends 26 and 27 of the inner sleeve 21. This flange 29 is approximately perpendicular to the axis X.

The fitting of this second embodiment is the same as that described with reference to the first embodiment.

Figure 3:
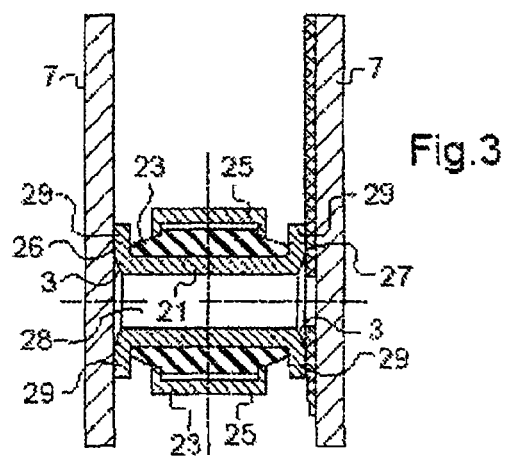
FIG. 3 shows a view in longitudinal section, along the axis of the inner sleeve, of the joint from FIG. 2, fitted in a yoked manner.

This second embodiment has the advantage of also being able to be fitted in a yoked manner, as is illustrated in FIG. 3, and in both directions.

In FIG. 3, the joint 2 from FIG. 2 is fitted in a yoked manner between the arms 7 of a fitting yoke. The arms 7 are parallel with one another and perpendicular to the axis X. The two ends 26 and 27 of the inner sleeve 21 each press against an arm 7 such that the inner sleeve 21 is compressed, along its length, between the arms 7. The presence of the reentrant conical frustums 3 does not in any way hamper this yoked fitting. The flanges 29 make it possible to have a large enough contact surface between the ends 26 and 27 of the inner sleeve 21 and the surface of the arms 7. This is because the presence of the conical frustums 3 reduces the surface area of the section of the piece forming the inner sleeve 21. This reduction in pressing surface area is compensated by the flanges 29, which can even form a much larger pressing surface area, equal to the thickness of the piece, than that which could have been obtained with the section of the sleeve 21 alone. These flanges 29 can comprise concentric circular ribs, which prevent sliding between the arms 7 of the yoke, as described in document FR 2 715 702.

According to a variant, not shown, of the first embodiment, the protruding cone or cones 3 have, at their free end, a planar surface which extends around the opening formed by the section of the passage formed in the inner sleeve 21. When the two ends 26 and 27 of the inner sleeve 21 each comprise a protruding cone 3, the thickness of which forms a planar surface such as this, the inner sleeve 21 can then also be fitted between the arms of a fitting yoke.

According to a variant, not shown, of the second embodiment, the planar surface is formed at the thickness of the inner sleeve 21. In this case, there is no radially protruding portion of the section of the inner sleeve 21, and the flange 29 is integrated into the inner sleeve 21.

The angle formed, in longitudinal section, between the axis X and the inner wall of the conical frustum 3 in the second embodiment is designated α (see FIG. 2). The value of α is selected by a person skilled in the art depending on the materials of which the inner sleeve 21 and the bushing 1 consist. The person skilled in the art can thus estimate a coefficient of friction between these two pieces. The angle α is preferably selected such that there is no jamming between the bushing 1 and the inner sleeve 21, or plastic deformation of the bushing 1 and/or of the inner sleeve 21, under the effect of the pressure exerted by the clamping means. The joint 2 can then be removed easily from the bushing 1. The value of α must be high enough to prevent jamming but low enough to limit effectively the shear forces (sliding) perpendicular to X.

The invention claimed is:

1. A motor vehicle structure comprising:
   a mounting portion on which is fitted an elastic shock absorber joint comprising an inner sleeve, the inner sleeve including a first end, a second end, and a central portion located between the first end and the second end and the central portion is covered with a sleeve made of elastic material, the inner sleeve being mounted in direct contact with the mounting portion by a clamping means that comprises a mounting element that passes through the inner sleeve, the inner sleeve and the sleeve made of elastic material having a same longitudinal axis,
   wherein a length of the central portion of the inner sleeve extends from a first end of the sleeve made of elastic material to a second end of the sleeve made of elastic material and the central portion of the inner sleeve has a constant outer diameter along the length of the central portion,
   wherein the inner sleeve includes a cylindrical wall, and a reentrant conical frustum is formed in a thickness of the wall at the first and second ends of the inner sleeve,
   wherein the first and second ends of the inner sleeve include a flange having a planar surface that extends radially outward from the reentrant conical frustum and around the end, such that the flange of the first end of the inner sleeve is fitted in abutment against a washer without the washer contacting the reentrant conical frustum, and
   wherein the mounting portion comprises a bushing that has one end secured to the mounting portion, and a free end, wherein a longitudinal passage opens out, the mounting element passing thorough the longitudinal passage, and wherein the reentrant conical frustum of the second end of the inner sleeve engages by conical interlocking with the free end of the bushing without the free end of the bushing contacting the flange of the second end.

2. The structure as claimed in claim 1, wherein the reentrant conical frustum has a top located on the longitudinal axis.

3. The structure as claimed in claim 1, wherein the free end of the bushing is a conical frustum and the conical frustum directly contacts the reentrant conical frustum of the second end of the inner sleeve.

4. The structure as claimed in claim 1, wherein the bushing includes an opening that forms a longitudinal passage through the bushing, the inner sleeve includes an opening that forms a longitudinal passage through the inner sleeve, and the opening of the bushing has a same diameter as the opening of the inner sleeve.

5. The structure as claimed in claim 1, wherein the bushing is thicker than the inner sleeve and the flange extends radially outward further than an outer surface of the bushing.

6. The structure as claimed in claim 1, wherein an outer surface of the bushing extends radially outward further than the central portion of the inner sleeve and the flange extends radially outward further than the outer surface of the bushing.

7. The structure as claimed in claim 1, wherein the sleeve made of elastic material includes an inner surface in contact with the central portion of the inner sleeve such that the inner surface of the sleeve made of elastic material has a constant diameter.

8. The structure as claimed in claim 1, wherein the sleeve made of elastic material directly contacts the flange of at least one of the first and second ends of the inner sleeve.

9. The structure as claimed in claim 1, wherein the sleeve made of elastic material does not contact the flange of at least one of the first and second ends of the inner sleeve.

* * * * *